US009020421B2

(12) United States Patent
Toshimitsu et al.

(10) Patent No.: US 9,020,421 B2
(45) Date of Patent: Apr. 28, 2015

(54) WIRELESS COMMUNICATION DEVICE AND WIRELESS COMMUNICATION SYSTEM

(71) Applicant: Kabushiki Kaisha Toshiba, Minato-ku, Tokyo (JP)

(72) Inventors: Kiyoshi Toshimitsu, Tokyo (JP); Akira Irube, Yokohama (JP); Mitsuru Onodera, Fujisawa (JP); Toshiki Miyasaka, Saitama (JP); Yoshinari Kumaki, Yokohama (JP); Tomoya Horiguchi, Tokyo (JP); Hirotsugu Kajihara, Yokohama (JP); Ichiro Seto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 135 days.

(21) Appl. No.: 13/781,104

(22) Filed: Feb. 28, 2013

(65) Prior Publication Data

US 2013/0324052 A1   Dec. 5, 2013

(30) Foreign Application Priority Data

Jun. 1, 2012   (JP) ................................. 2012-126294
Sep. 24, 2012   (JP) ................................. 2012-209433

(51) Int. Cl.
*H04W 8/22* (2009.01)
*H04W 52/02* (2009.01)

(52) U.S. Cl.
CPC ................. *H04W 8/22* (2013.01); *Y02B 60/50* (2013.01); *H04W 52/0254* (2013.01)

(58) Field of Classification Search
CPC ..... H04W 4/008; H04W 76/023; H04W 4/02; H04W 8/005; H04W 12/02; H04W 12/04; H04W 12/08

USPC ................. 455/13.4, 343.5, 522, 573, 127.1, 455/343.1, 41.2; 340/572.2, 10.1, 10.3
See application file for complete search history.

(56) References Cited

U.S. PATENT DOCUMENTS

| | | | | |
|---|---|---|---|---|
| 4,688,036 | A * | 8/1987 | Hirano et al. | 340/5.62 |
| 7,521,890 | B2 * | 4/2009 | Lee et al. | 320/108 |
| 7,679,514 | B2 * | 3/2010 | Rofougaran et al. | 340/572.2 |
| 8,022,825 | B2 * | 9/2011 | Rofougaran et al. | 340/572.2 |
| 8,432,285 | B2 * | 4/2013 | Rofougaran et al. | 340/572.2 |
| 2007/0167135 | A1 * | 7/2007 | Fontijn | 455/41.2 |

(Continued)

OTHER PUBLICATIONS

Standard ECMA-398, "Close Proximity Electric Induction Wireless Communications," Ecma International 2011.

(Continued)

*Primary Examiner* — Minh D Dao
(74) *Attorney, Agent, or Firm* — Holtz, Holtz, Goodman & Chick PC

(57) ABSTRACT

According to an embodiment, a wireless communication device includes a first wireless communication section, a wireless power receiving section and a wireless control section. The first wireless communication section is configured to transmit and receive a first wireless signal. The wireless power receiving section is configured to receive power by a second wireless signal. The wireless control section is configured to control the first wireless communication section according to a wireless power reception state of the wireless power receiving section. The wireless control section activates the first wireless communication section after wireless power reception by the wireless power receiving section is started.

16 Claims, 14 Drawing Sheets

WIRELESS COMMUNICATION DEVICE

(56) References Cited

U.S. PATENT DOCUMENTS

2013/0145184 A1* 6/2013 Tatsumoto et al. ........... 713/300
2014/0121557 A1* 5/2014 Gannon et al. ................ 600/549

OTHER PUBLICATIONS

Standard ECMA-399, "Procedure for the Registration of Assigned Numbers for ECMA-398," Ecma International 2011.

* cited by examiner

WIRELESS COMMUNICATION DEVICE AND WIRELESS COMMUNICATION SYSTEM

CROSS REFERENCE TO RELATED APPLICATION

This application is based upon and claims the benefit of priority from the prior Japanese Patent Application No. 2012-126294 filed on Jun. 1, 2012 and No. 2012-209433 filed on Sep. 24, 2012 in Japan, the entire contents of which are incorporated herein by reference.

FIELD

Embodiments described herein relate generally to a wireless communication device and a wireless communication system.

BACKGROUND

Portable electronic devices and the like provided with a wireless communication device including a wireless communication section capable of performing close proximity wireless communication are known. As the communication method of close proximity wireless communication, TransferJet (registered trademark) or the like is used, for example.

Conventionally, the wireless communication section of such a wireless communication device is activated in conjunction with turning on of the wireless communication device by a user, or by the startup of application software by the user or the switching between on and off of the wireless communication section of the user. That is, an operation of activating the wireless communication section by the user is necessary.

DETAILED DESCRIPTION

According to an embodiment, a wireless communication device includes a first wireless communication section, a wireless power receiving section and a wireless control section. The first wireless communication section is configured to transmit and receive a first wireless signal. The wireless power receiving section is configured to receive power by a second wireless signal. The wireless control section is configured to control the first wireless communication section according to a wireless power reception state of the wireless power receiving section. The wireless control section activates the first wireless communication section after wireless power reception by the wireless power receiving section is started.

Hereinafter, embodiments of the present invention will be described with reference to the drawings. These embodiments are not to limit the present invention.

(First Embodiment)

A first embodiment is related to a wireless communication device 10 on the power receiving side including a wireless power receiving section 12, and one of its features is that a first wireless communication section 11 is activated and standby reception is started after wireless power reception is started.

Figure 1:
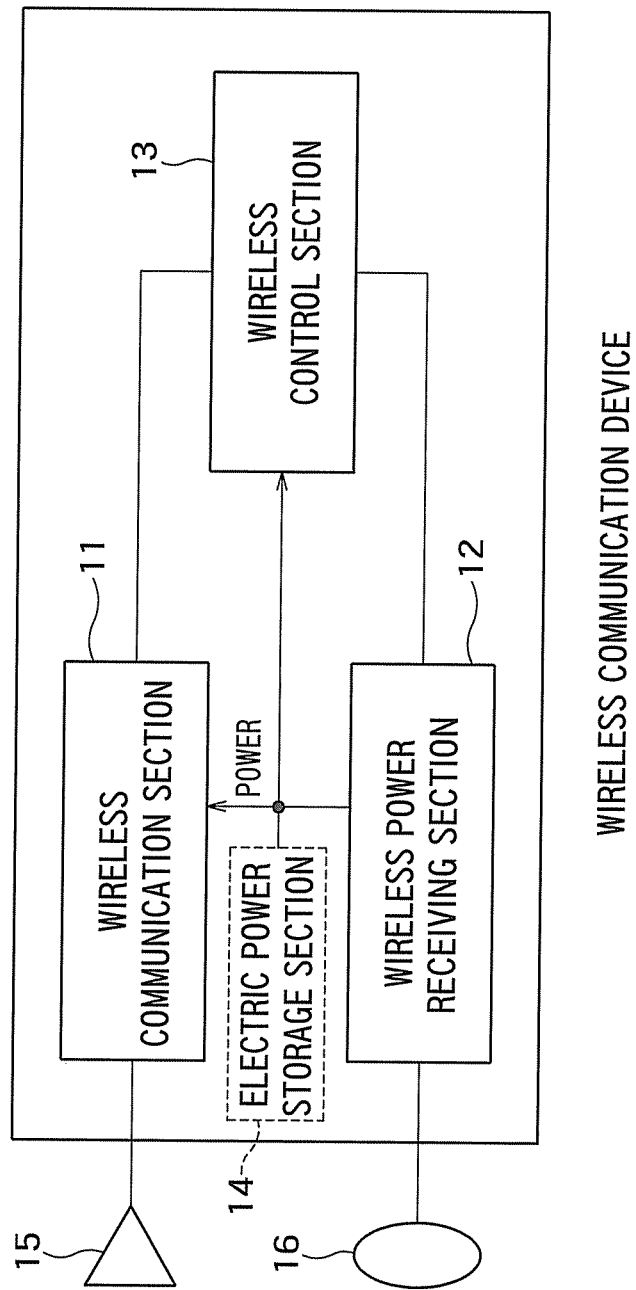
FIG. 1 is a block diagram showing a configuration of a wireless communication device with a wireless power receiver according to a first embodiment.

FIG. 1 is a block diagram showing a configuration of the wireless communication device 10 with a wireless power receiver according to the first embodiment. As shown in FIG. 1, the wireless communication device 10 includes a first wireless communication section 11, a wireless power receiving section 12, a wireless control section 13, an electric power storage section 14, an antenna 15, and a coil 16.

The wireless communication device 10 is configured to be capable of performing close proximity wireless communication with a wireless communication device on the power transmission side (not shown), and so as to be wirelessly supplied with power by the wireless communication device on the power transmission side. The wireless communication device on the power transmission side may be a known wireless communication device that transmits/receives a first wireless signal for close proximity wireless communication and that transmits power by a second wireless signal, or it may be a wireless communication device 20 of a fourth embodiment described later.

For example, the wireless communication device 10 may be provided in a portable electronic device such as a smartphone, and the wireless communication device on the power transmission side may be provided in a vehicle-mounted system such as a car navigation system mounted on a vehicle. According to such a configuration, the portable electronic device may be wirelessly supplied with power from the vehicle-mounted system, and may also transmit data related to car navigation to the vehicle-mounted system or perform application processing on data received from the vehicle-mounted system.

Furthermore, for example, the wireless communication device 10 may be provided in a wireless memory capable of wirelessly writing/reading data, and the wireless communication device on the power transmission side may be provided in a portable electronic device such as a smartphone. According to such a configuration, the wireless memory may be wirelessly supplied with power from the portable electronic device, and may also transmit data which has been read to the portable electronic device or write data received from the portable electronic device.

Moreover, for example, the wireless communication device on the power transmission side may be a device provided with a storage medium such as a hard disk or an SSD.

The first wireless communication section 11 is switched between on and off, and when in the on state, transmits or receives a first wireless signal for close proximity wireless communication via the antenna 15. In the following explanation, the communication standard for close proximity wireless communication is assumed to be TransferJet, for example. That is, the antenna 15 is configured from a coupler, and the center frequency of the first wireless signal is 4.48 GHz. Additionally, the communication standard for close proximity wireless communication is not limited to TransferJet. Also, near field wireless communication such as Bluetooth (registered trademark) or a wireless LAN or wireless communication that uses millimeter waves may also be used without being limited to close proximity wireless communication.

The wireless power receiving section 12 receives power by a second wireless signal different from the first wireless signal, via the coil 16. For example, the wireless power receiving section 12 receives power using electromagnetic induction, by a method compliant with the standard by Wireless Power Consortium (WPC). The wireless power receiving section operates on the received power. The wireless power receiving section 12 may also receive power by a magnetic resonance method, or it may be compliant with the standard for near field communication (NFC).

The wireless control section 13 is configured from a CPU or the like, for example, and controls the first wireless communication section 11 according to the wireless power receiving state of the wireless power receiving section 12. Specifically, the wireless control section 13 activates the first wireless communication section 11 after the wireless power reception by the wireless power receiving section 12 is started. Furthermore, the wireless control section 13 also performs signal processing for performing close proximity wireless communication and the like.

The electric power storage section 14 is configured from a battery capable of charging and discharging, for example, and is capable of storing power received by the wireless power receiving section 12. The electric power storage section 14 may be configured to be able to also store power supplied from outside. The first wireless communication section 11 and the wireless control section 13 operate on the power stored in the electric power storage section 14.

Additionally, the wireless communication device 10 does not have to include the electric power storage section 14. In this case, the first wireless communication section 11 and the wireless control section 13 operate on the power received by the wireless power receiving section 12.

Next, an operation of the wireless communication device 10 will be described with reference to FIG. 2.

Figure 2:
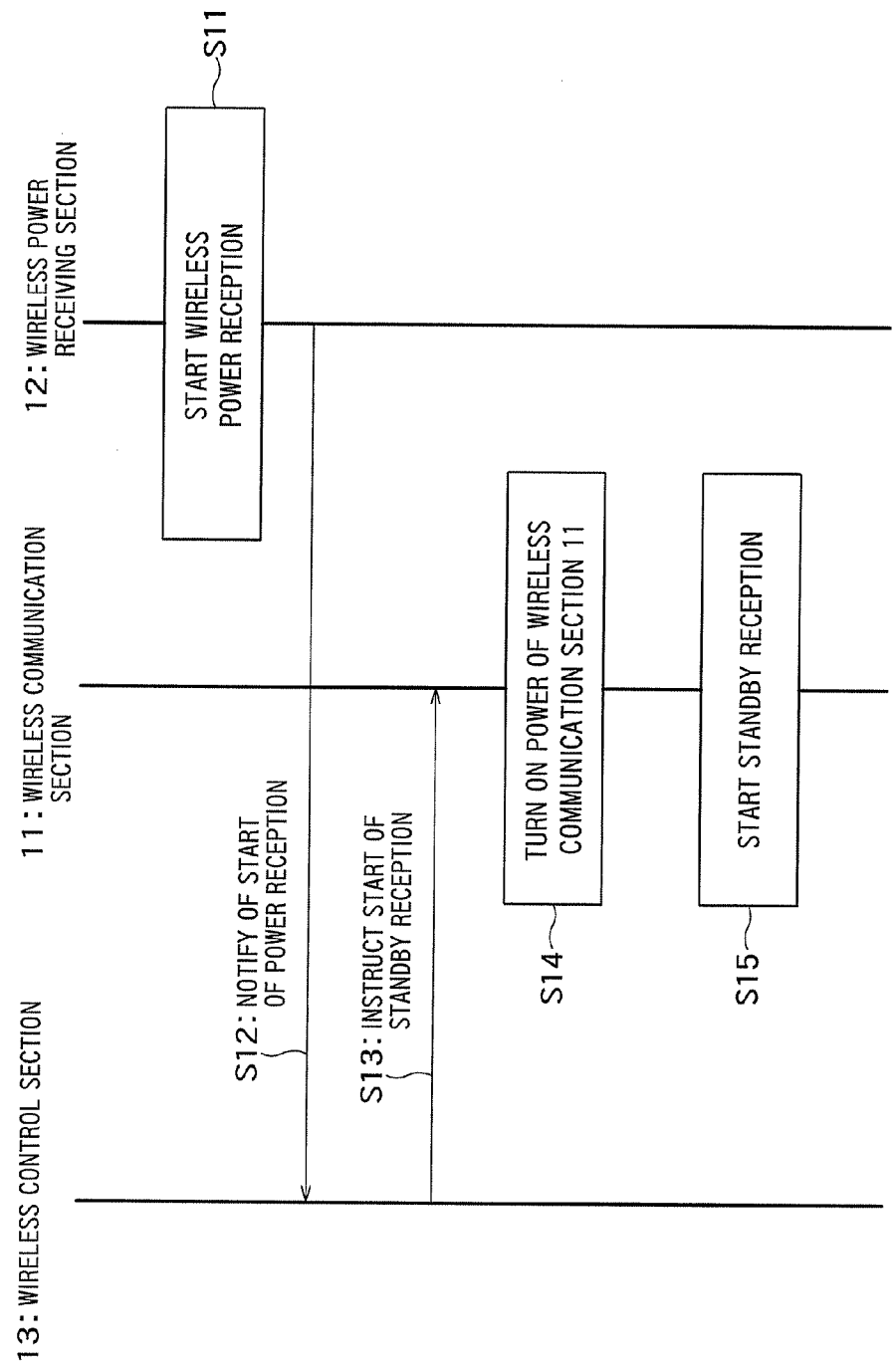
FIG. 2 is a sequence diagram showing an operation of the wireless communication device according to the first embodiment.

FIG. 2 is a sequence diagram showing an operation of the wireless communication device 10 according to the first embodiment. It is assumed that, at first, the wireless communication device on the power transmission side is transmitting power by the second wireless signal, and the first wireless communication section 11, the wireless power receiving section 12 and the wireless control section 13 of the wireless communication device 10 are not in operation and the power consumption thereof is approximately zero.

When the wireless communication device 10 is placed, by a user, at a position near the wireless communication device on the power transmission side where power reception is possible, the wireless power receiving section 12 starts wireless reception of power by the second wireless signal (step S11). The wireless power receiving section 12 can recognize the start of wireless power reception by a change in the current flowing through the coil 16 or the like. Then, the wireless power receiving section 12 notifies the wireless control section 13 of the start of power reception (step S12).

When notified of the start of power reception, the wireless control section 13 instructs the first wireless communication section 11 to start standby reception (step S13).

When instructed to start standby reception, the first wireless communication section 11 turns on, i.e. activates, the first wireless communication section 11 (step S14), and after the activation, starts the standby reception (step S15).

After step S15, by receiving a wireless connection request signal transmitted by the wireless communication device on the power transmission side by the first wireless signal, connection to the wireless communication device on the power transmission side is established and the first wireless communication section 11 in a standby receive state is enabled to perform communication. High-speed data transfer based on close proximity wireless communication between the wireless communication device 10 and the wireless communication device on the power transmission side is thereby enabled.

As described, according to the present embodiment, since the first wireless communication section 11 is activated after wireless power reception by the wireless power receiving section is started, a user can activate the first wireless communication section 11 simply by placing the wireless communication device 10 at a position where power can be received, without performing other operations. Accordingly, the convenience of the user can be enhanced.

Furthermore, since, in a state where power is not wirelessly supplied, the first wireless communication section 11 is not activated and does not enter a standby receive state, wasteful consumption of power of the electric power storage section 14 can be prevented.

Additionally, as described above, also in the case the wireless communication device 10 is not provided with the electric power storage section 14, the user can activate the first wireless communication section 11 simply by placing the wireless communication device 10 at a position where power can be received, without performing other operations, and the convenience of the user can be enhanced.

(Second Embodiment)

A second embodiment is different from the first embodiment in that the first wireless communication section 11 is activated after stable wireless power reception is started.

In the present embodiment, the wireless power receiving section 12 of the wireless communication device 10 includes a first phase where at least negotiation for stable wireless power reception is performed according to the start of wireless power reception, and a second phase where stable wireless power reception is started after completion of the negotiation. The wireless control section 13 activates the first wireless communication section 11 after the wireless power receiving section 12 has shifted from the first phase to the second phase. Other configurations of the wireless communication device 10 are the same as those of the first embodiment in FIG. 1, and drawings and explanation thereof are not repeated here.

Figure 3:
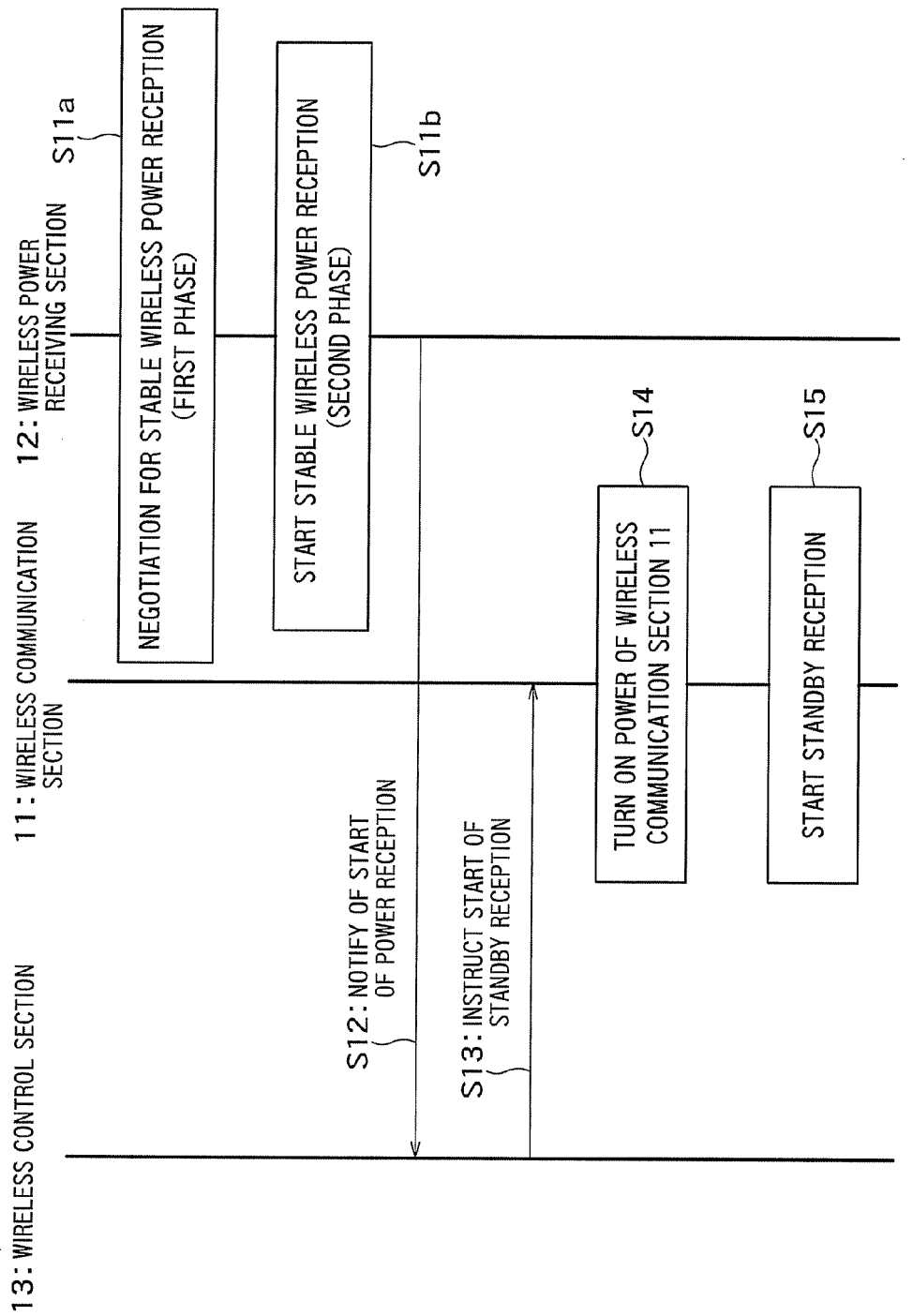
FIG. 3 is a sequence diagram showing an operation of a wireless communication device according to a second embodiment.

FIG. 3 is a sequence diagram showing an operation of the wireless communication device 10 according to the second embodiment. It is assumed that, at first, the wireless communication device on the power transmission side (not shown) is transmitting power and information enabling negotiation by modulating the second wireless signal.

As shown in FIG. 3, first, the wireless power receiving section 12 performs negotiation for stable wireless power reception according to the start of wireless power reception (the first phase, step S11*a*). Specifically, the wireless power receiving section 12 starts wireless reception of power enabling negotiation, by the second wireless signal transmitted by the wireless communication device on the power transmission side. Then, the wireless power receiving section 12 operates using the received power and demodulates, and modulates, the second wireless signal to perform negotiation with the wireless communication device on the power transmission side. The wireless power receiving section 12 may also perform the negotiation using the power of the electric power storage section 14. During the negotiation, mutual authentication is performed, or the wireless power receiving section 12 transmits permission for power transmission or setting of transmission power, for example.

When the negotiation is complete, the wireless communication device on the power transmission side starts stable wireless power transmission by the second wireless signal, according to the result of the negotiation. Specifically, the wireless communication device on the power transmission side continuously wirelessly transmits power greater than the power enabling negotiation.

The wireless power receiving section 12 starts stable wireless power reception after the negotiation is completed (the second phase, step S11*b*).

The processes of steps S12 to S15 following step S11*b* are the same as those of the first embodiment, and explanation thereof is not repeated here.

As described above, according to the present embodiment, the wireless control section 13 activates the first wireless communication section 11 after the wireless power receiving section 12 has shifted from the first phase to the second phase, that is, after stable wireless power reception is started. That is, since the state of wireless power reception is made clear, starting of standby reception in an unstable wireless power reception state can be prevented. Accordingly, an inconvenience that, after the standby reception is started in an unstable wireless power reception state, standby reception is interrupted because the received power is insufficient can be prevented.

(Third Embodiment)

A third embodiment is different from the first embodiment in that standby reception is continued for a predetermined period of time and the standby reception is then stopped if the first wireless signal is not received within the predetermined period of time.

Figure 4:
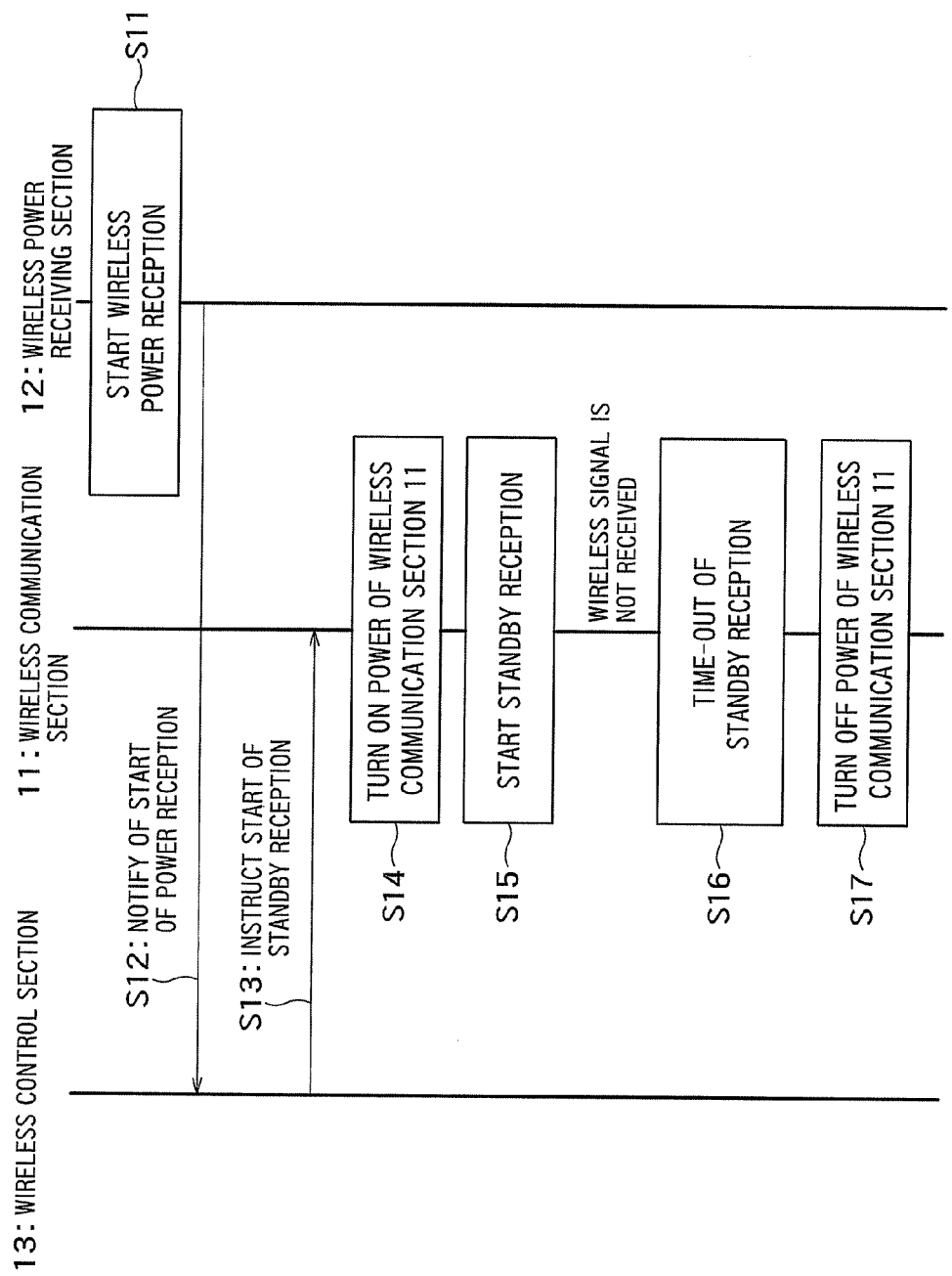
FIG. 4 is a sequence diagram showing an operation of a wireless communication device according to a third embodiment.

FIG. 4 is a sequence diagram showing an operation of the wireless communication device 10 according to the third embodiment. The processes of steps S11 to S15 in FIG. 4 are the same as those of the first embodiment, and explanation thereof is not repeated here.

After standby reception is started in step S15, the first wireless communication section 11 continues the standby reception for a predetermined period of time, and if the first wireless signal is not received within the predetermined period of time, determines that time-out for the standby reception has occurred (step S16) and turns off the power of the first wireless communication section 11 (step S17). That is, the standby reception is stopped.

As described, according to the present embodiment, since standby reception is stopped if the first wireless signal is not received within a predetermined period of time, low power consumption can be achieved. As a case where the first wireless signal is not received within a predetermined period of time in a state where power is wirelessly supplied to the wireless communication device 10, a case is conceivable where a wireless communication device on the power transmission side transmitting the first wireless signal is not present within a distance where communication of the first wireless signal is possible. That is, a case is conceivable where the wireless communication device 10 received power from a power transmission device that only transmits power, for example.

Additionally, when, after step S17, a user moves the wireless communication device 10 near a desired wireless communication device on the power transmission side to perform data transfer, the wireless communication device 10 again performs the process from step S11, and is enabled to communicate.

Furthermore, the third embodiment may be combined with the second embodiment.

(Fourth Embodiment)

A fourth embodiment is related to a wireless communication device 20 on the power transmission side including a wireless power transmission section 22, and one of its features is that a wireless communication section 21 is activated and transmission of a wireless signal is started after wireless power transmission is started.

Figure 5:
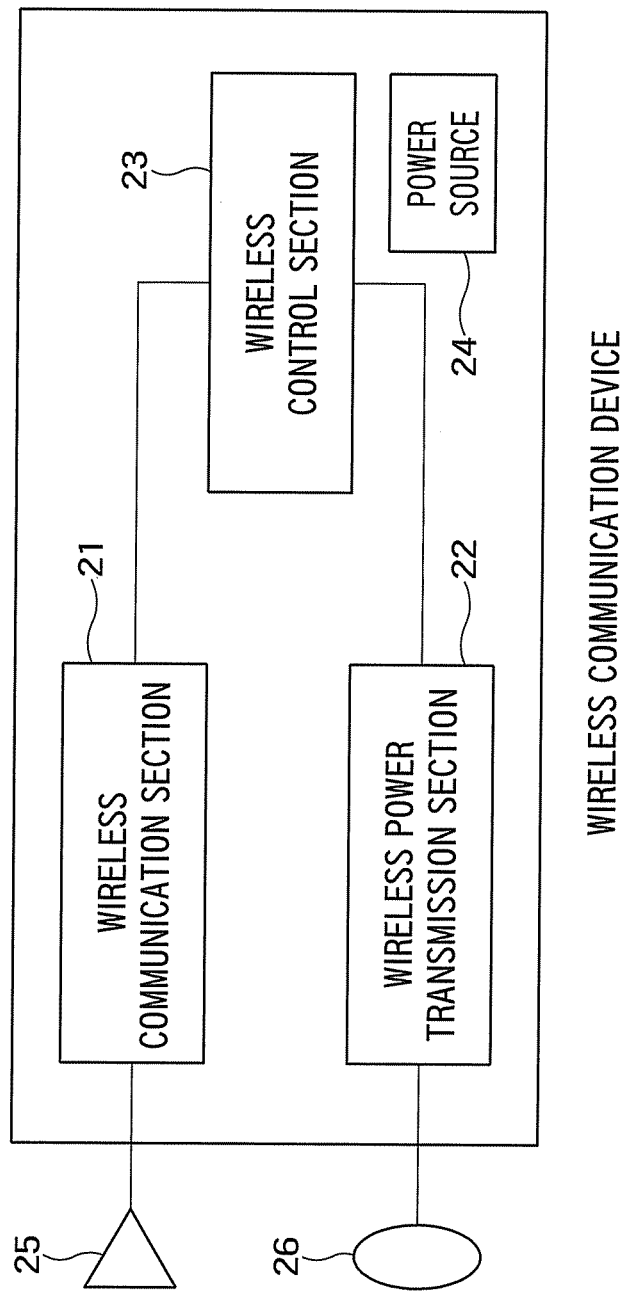
FIG. 5 is a block diagram showing a configuration of a wireless communication device with a wireless power transmitter according to a fourth embodiment.

FIG. 5 is a block diagram showing a configuration of the wireless communication device 20 with a wireless power transmitter according to the fourth embodiment. As shown in FIG. 5, the wireless communication device 20 includes a wireless communication section 21, a wireless power transmission section 22, a wireless control section 23, a power source 24, an antenna 25, and a coil 26.

The wireless communication device 20 is configured to be capable of performing close proximity wireless communication with a wireless communication device on the power receiving side (not shown), and so as to wirelessly supply power to the wireless communication device on the power receiving side. The wireless communication device on the power receiving side may be the wireless communication device 10 of any of the first to third embodiments, for example, or it may be a known wireless communication device that transmits/receives the first wireless signal for close proximity wireless communication and that receives power by the second wireless signal. In the present embodiment, an explanation is given assuming the wireless communication device 10 of the first embodiment. The wireless communication device 10 and the wireless communication device 20 form a wireless communication system.

The wireless communication section 21 is switched between on and off, and when in the on state, transmits or receives the first wireless signal for close proximity wireless communication via the antenna 25. In the present embodiment, the communication standard for close proximity wireless communication is TransferJet, the antenna 25 is configured from a coupler, and the center frequency of the first wireless signal is 4.48 GHz. Additionally, as described in the first embodiment, the communication standard for close proximity wireless communication is not limited to the above. Also, near field wireless communication may also be used without being limited to close proximity wireless communication.

The wireless power transmission section 22 transmits power by the second wireless signal, via the coil 26. For example, the wireless power transmission section 22 transmits power using electromagnetic induction, by a method compliant with the standard by WPC. As in the first embodiment, the wireless power transmission section 22 may also transmit power by the magnetic resonance method or it may be compliant with the standard for NFC.

The wireless control section 23 is configured from a CPU or the like, for example, and controls the wireless communication section 21 according to the wireless power transmission state of the wireless power transmission section 22. Specifically, the wireless control section 23 activates the wireless communication section 21 after the wireless power transmission by the wireless power transmission section 22 is started. The wireless communication section 21 transmits the first wireless signal after being activated. Furthermore, the wireless control section 23 also performs signal processing for performing close proximity wireless communication and the like.

The power source 24 is a battery, for example, and supplies power to the wireless communication section 21, the wireless power transmission section 22, and the wireless control section 23.

Next, an operation of the wireless communication device 20 will be described with reference to FIG. 6.

Figure 6:
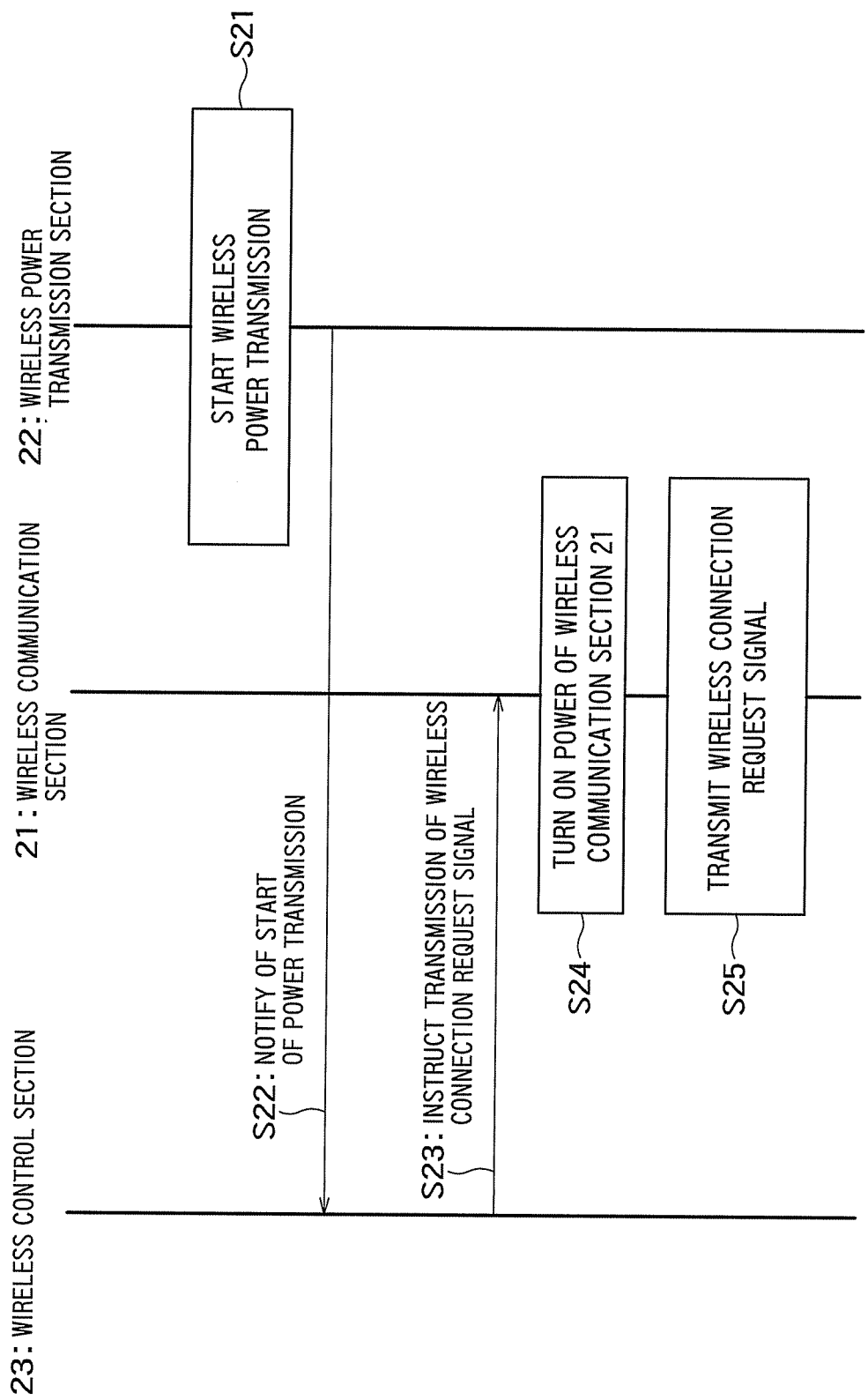
FIG. 6 is a sequence diagram showing an operation of the wireless communication device according to the fourth embodiment.

FIG. 6 is a sequence diagram showing an operation of the wireless communication device 20 according to the fourth embodiment. At first, the wireless communication section 21, the wireless power transmission section 22, and the wireless control section 23 are not in operation, and the power consumption thereof is approximately zero.

First, when the wireless power transmission section 22 is activated by an operation of a user or by reception of an activation signal from outside, the wireless power transmission section 22 starts transmitting power by the second wireless signal (step S21). Then, the wireless power transmission section 22 notifies the wireless control section 23 of the start of power transmission (step S22).

When notified of the start of power transmission, the wireless control section 23 instructs the wireless communication section 21 to transmit a wireless connection request signal (step S23).

When instructed to transmit a wireless connection request signal, the wireless communication section 21 turns on, i.e. activates, the wireless communication section 21 (step S24), and after the activation, transmits the wireless connection request signal by transmitting the first wireless signal (step S25).

Then, the wireless communication device 10 on the power receiving side is brought near the wireless communication device 20, starts wireless power reception (step S11 in FIG. 2), starts standby reception (step S15 in FIG. 2), and receives the wireless connection request signal. Connection between the wireless communication device 10 and the wireless communication device 20 is thereby established, and close proximity wireless communication is enabled. High-speed data transfer based on close proximity wireless communication is thereby enabled. The same can be said for a case where the wireless communication device 20 is brought near the wireless communication device 10 on the power receiving side and wireless power reception is started.

As described, according to the present embodiment, the wireless control section 23 activates the wireless communication section 21 after wireless power transmission by the wireless power transmission section 22 is started. A user is thereby enabled to activate the wireless communication section 21 simply by performing an operation of starting wireless power transmission, without performing other operations, and also, useless transmission of the first wireless signal before the wireless power transmission is started can be prevented. Accordingly, the convenience of the user can be enhanced, and low power consumption can be achieved.

(Fifth Embodiment)

According to a fifth embodiment, the first wireless communication section 11, the wireless power receiving section 12, the antenna 15, and the coil 16 of the wireless communication device 10, and the wireless communication section 21, the wireless power transmission section 22, the antenna 25, and the coil 26 of the wireless communication device 20 are configured such that a distance DA allowing power supply by the second wireless signal is less than a distance DB allowing communication by the first wireless signal.

Figure 7:
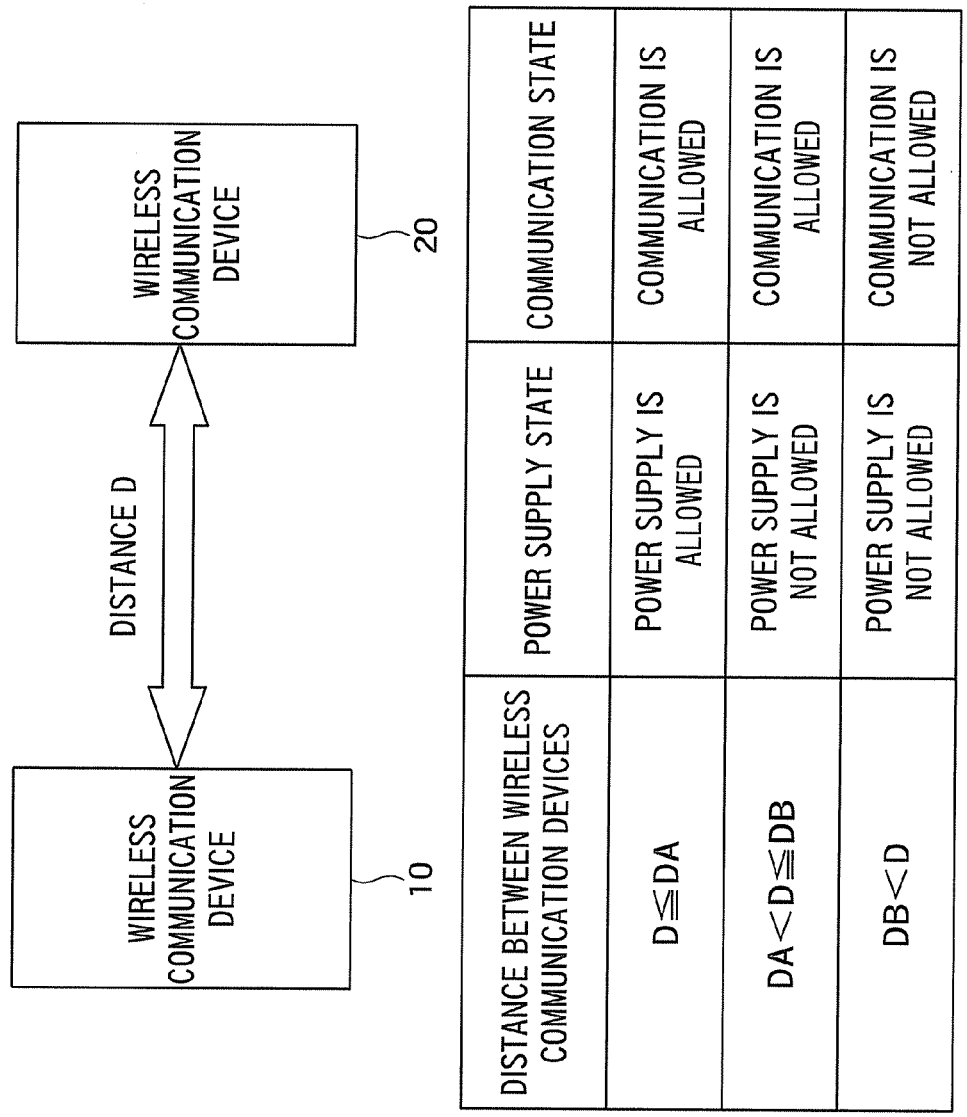
FIG. 7 is a diagram showing a relationship between a distance between wireless communication devices, a power supply state and a communication state according to a fifth embodiment.

FIG. 7 is a diagram showing a relationship between a distance D between the wireless communication devices 10 and 20, a power supply state and a communication state according to the fifth embodiment. The wireless communication devices 10 and 20 form a wireless communication system.

As shown in FIG. 7, if the distance D is equal to or less than the distance DA (D≤DA), power supply and communication are allowed.

If the distance D is more than the distance DA and is equal to or less than the distance DB (DA<D≤DB), power supply is not allowed and communication is allowed.

If the distance D is more than the distance DB (DB<D), power supply and communication are not allowed.

As described, according to the present embodiment, since the distance DA allowing power supply by the second wireless signal is less than the distance DB allowing communication by the first wireless signal, wireless communication can be reliably performed when wireless power supply is performed.

(Sixth Embodiment)

A present embodiment is different from the first embodiment in that the wireless communication device includes two wireless communication sections.

Figure 8:
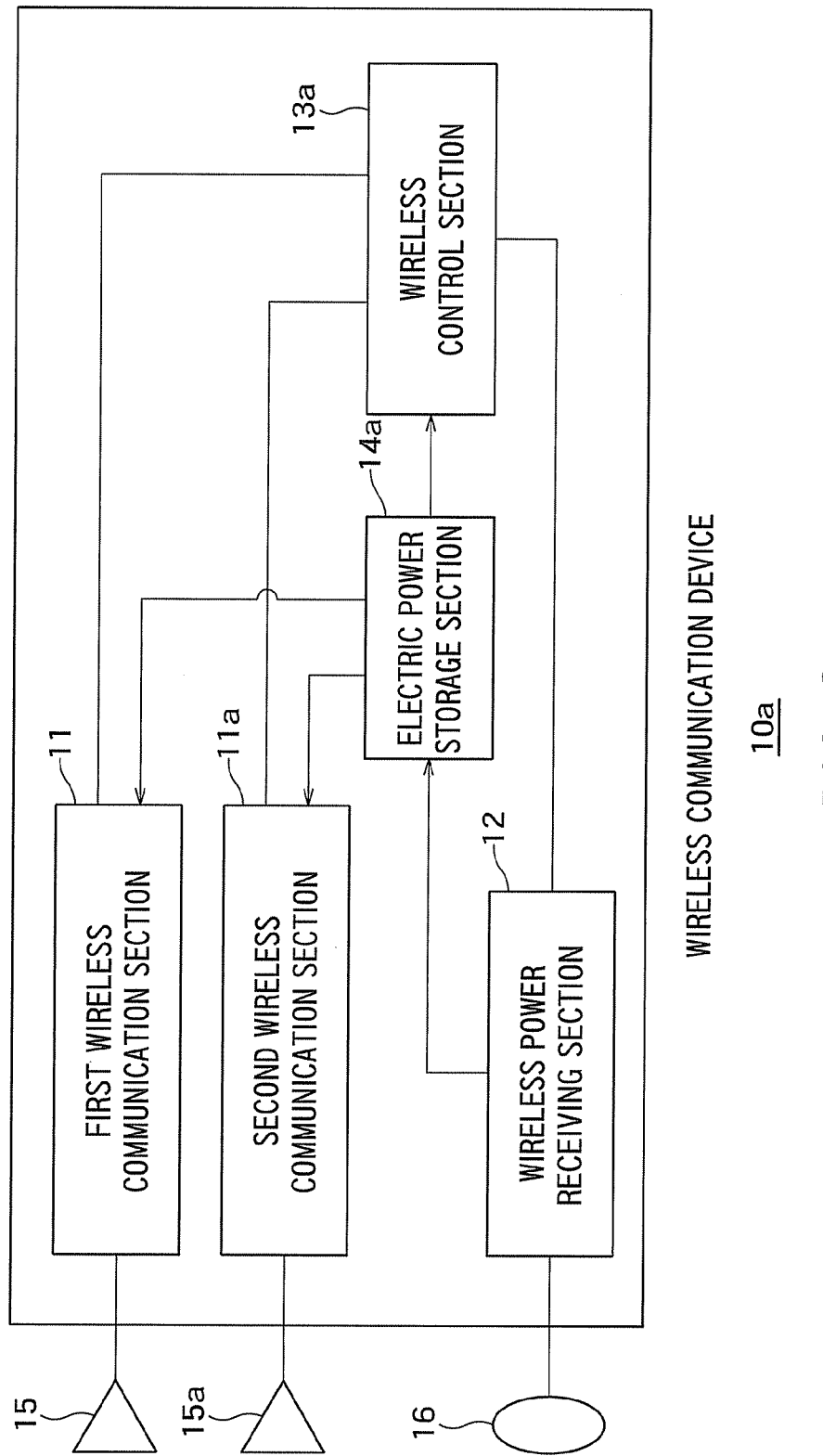
FIG. 8 is a block diagram showing a configuration of a wireless communication device according to a sixth embodiment.

FIG. 8 is a block diagram showing a configuration of a wireless communication device 10a according to a sixth embodiment. As shown in FIG. 8, the wireless communication device 10a includes the first wireless communication section 11, a second wireless communication section 11a, the wireless power receiving section 12, a wireless control section 13a, a electric power storage section 14a, antennas 15 and 15a, and the coil 16. In FIG. 8, structural elements same as those in FIG. 1 are denoted with the same reference numerals, and differences will be mainly described in the following.

The wireless communication device 10a is configured to be capable of performing close proximity wireless communication and near field wireless communication with a wireless communication device on the power transmission side (not shown), and so as to be wirelessly supplied with power by the wireless communication device on the power transmission side. The wireless communication device on the power transmission side is a wireless communication device that transmits and receives the first wireless signal for close proximity wireless communication and a third wireless signal for near field wireless communication, and that transmits power by the second wireless signal.

In the present embodiment, close proximity wireless communication refers to wireless communication that is performed in a state where the wireless communication device 10a and the wireless communication device on the power transmission side are in contact with each other or brought close to each other, to a distance of around several centimeters, for example. As described above, as the communication standard for close proximity wireless communication, there is TransferJet, for example. Also, near field wireless communication refers to wireless communication that is performed at a short distance of several tens of meters or less, for example. As described above, as the communication standard for near field wireless communication, there are Bluetooth (registered trademark) or a wireless LAN (for example, WiFi (registered trademark)), a millimeter wave wireless communication that uses a millimeter waveband, and the like, for example.

The second wireless communication section 11a is switched between on and off, and when in the on state, switching between a normal communication mode and a low power consumption mode (a power save mode) in which the power consumption is lower than in the normal communication mode is allowed. The second wireless communication section 11a transmits and receives the third wireless signal for near field wireless communication via the antenna 15a in the normal communication mode and the low power consumption mode. The communication range of the second wireless communication section 11a is greater than that of the first wireless communication section 11 for performing close proximity wireless communication. In the normal communication mode, the second wireless communication section 11a performs data transfer by near field wireless communication, and in the low power consumption mode, for example, it intermittently performs transmission/reception at a cycle longer than in the normal communication mode to maintain a call connection state and lower power consumption.

The wireless control section 13a controls the first and second wireless communication sections 11 and 11a according to the communication states of the first and second wireless communication section 11 and 11a and the wireless power reception state of the wireless power receiving section 12. Specifically, after wireless power reception by the wireless power receiving section 12 is started, the wireless control section 13a activates the second wireless communication section 11a, in addition to the first wireless communication section 11, and when communication by the first wireless communication section 11 which has been activated and communication, in the normal communication mode, by the second wireless communication section 11a which has been activated are established, the wireless control section 13a causes the second wireless communication section 11a to shift to the low power consumption mode while maintaining the communication. Furthermore, the wireless control section 13a also performs signal processing for performing close proximity wireless communication and near field wireless communication, and the like.

As in the first embodiment, the electric power storage section 14a is configured from a battery capable of charging and discharging, for example, and is capable of storing power received by the wireless power receiving section 12. The electric power storage section 14a may be configured to be able to also store power supplied from outside. The first and second wireless communication sections 11 and 11a, and the wireless control section 13a operate on the power stored in the electric power storage section 14a.

Additionally, the wireless communication device 10a does not have to include the electric power storage section 14a. In this case, the first and second wireless communication sections 11 and 11a, and the wireless control section 13a operate on the power received by the wireless power receiving section 12.

Next, an operation of the wireless communication device 10a will be described with reference to FIG. 9.

Figure 9:
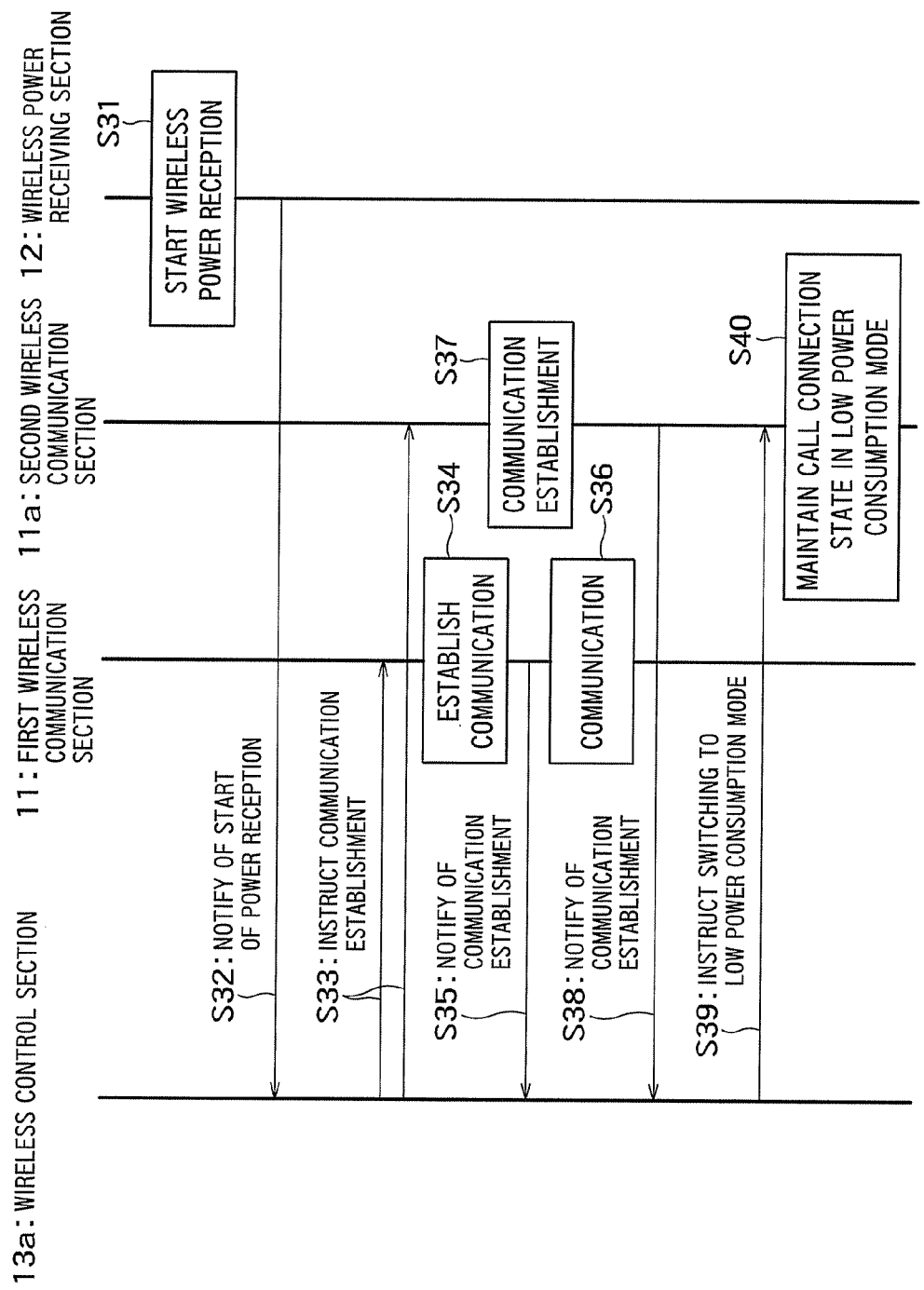
FIG. 9 is a sequence diagram showing an operation of the wireless communication device according to the sixth embodiment.

FIG. 9 is a sequence diagram showing an operation of the wireless communication device 10a according to the sixth embodiment. It is assumed that, at first, a wireless communication device on the power transmission side is transmitting power by the second wireless signal, and the first and second wireless communication sections 11 and 11a, the wireless power receiving section 12, and the wireless control section 13a of the wireless communication device 10a are not in operation and the power consumption thereof is approximately zero.

When the wireless communication device 10a is placed, by a user, at a position near the wireless communication device on the power transmission side where power reception is possible, the wireless power receiving section 12 starts wireless reception of power by the second wireless signal (step S31). Then, the wireless power receiving section 12 notifies the wireless control section 13a of the start of power reception (step S32).

When notified of the start of power reception, the wireless control section 13a instructs the first and second wireless communication sections 11 and 11a to establish communication (step S33).

When instructed to establish communication, the first wireless communication section 11 turns on, i.e. activates, the first wireless communication section 11, and after the activation, establishes communication with the wireless communication device on the power transmission side according to the communication standard of close proximity wireless communication (step S34). The first wireless communication section 11 may be configured as a responder that starts standby reception after being activated, or as an initiator that transmits a wireless connection request signal after being activated.

When the communication is established, the first wireless communication section 11 notifies the wireless control section 13a of communication establishment (step S35), and enters a communicating state (step S36).

When instructed to establish communication, the second wireless communication section 11a turns on, i.e. activates, the second wireless communication section 11a, and after the activation, establishes communication with the wireless communication device on the power transmission side according to the communication standard of near field wireless communication, in the normal operation mode (step S37).

When the communication is established, the second wireless communication section 11a notifies the wireless control section 13a of communication establishment (step S38).

That is, the wireless communication device 10a is configured in such a manner that a plurality of wireless systems is activated with wireless power supply as the trigger.

When notified by the first wireless communication section and the second wireless communication section 11a of communication establishment, the wireless control section 13a instructs the second wireless communication section 11a to switch to the low power consumption mode (step S39).

The second wireless communication section 11a thereby switches from the normal operation mode to the low power consumption mode, and maintains a call connection state in the low power consumption mode (step S40).

The wireless communication device 10a is enabled in this manner to perform high-speed data transfer with the wireless communication device on the power transmission side by close proximity wireless communication by the first wireless communication section 11.

Also, in the case where communication using the second wireless communication section 11a was performed before the wireless power supply, that is, before the start of wireless power reception by the wireless power receiving section 12, a reconnection process for the second wireless communication section 11a is performed with the wireless power supply as the trigger. Normally, a base station which is the connection destination of the first wireless communication section 11 and a base station which is the connection destination of the second wireless communication section 11a are positioned relatively close to each other, and the second wireless communication section 11a can be connected to a desired base station by the reconnection process. Or, to more reliably connect the second wireless communication section 11a to a desired base station, the wireless control section 13a checks whether the base station to which the second wireless communication section 11a is connected is a base station associated with the base station which is the connection destination of the first wireless communication section 11, and the wireless control section performs the reconnection process in the case where the base station is not associated with the base station which is the connection destination of the first wireless communication section 11. Determination of whether or not the base station is associated with the base station which is the connection destination of the first wireless communication section 11 is performed by receiving base station information associated with the first wireless communication section 11 during a connection process of the first wireless communication section 11 or during a wireless power transmission/reception process.

As described, according to the present embodiment, since the second wireless communication section 11a is configured to shift to the low power consumption mode when close proximity wireless communication such as TransferJet by the first wireless communication section 11 and near field wireless communication such as WiFi by the second wireless communication section 11a are established, wasteful power consumption can be reduced.

Also, the same effects as the first embodiment can be achieved.

(Seventh Embodiment)

In a present embodiment, the first wireless communication section 11 is configured as a responder. The wireless control section 13a causes the second wireless communication section 11a to shift to the normal communication mode and causes the first wireless communication section 11 to start standby reception in a case communication by the first wireless communication section 11 is disconnected while the second wireless communication section 11a is in the low power consumption mode. The wireless control section 13a turns off the power of the first wireless communication section 11 in the case communication by the first wireless communication section 11 and communication by the second wireless communication section 11a are disconnected.

Other configurations of the wireless communication device 10a are the same as those of the sixth embodiment in FIG. 8, and drawings and explanation thereof are not repeated here.

Figure 10:
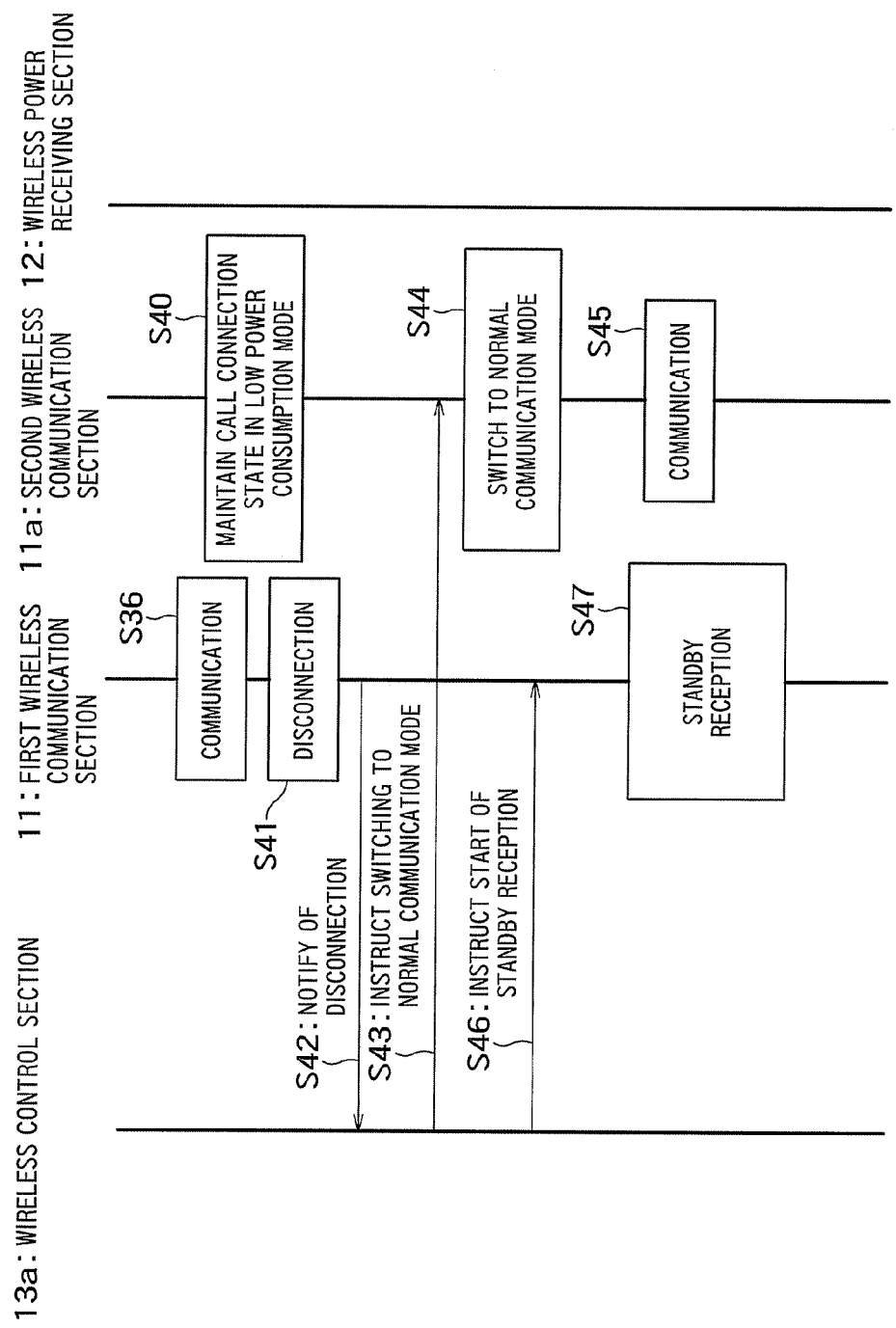
FIG. 10 is a sequence diagram showing an operation of a wireless communication device according to a seventh embodiment.

FIG. 10 is a sequence diagram showing an operation of the wireless communication device 10a according to the seventh embodiment. FIG. 10 shows the operation following steps S36 and S40 in FIG. 9.

When the communicating state (step S36) shifts to a state where communication is disconnected (step S41), the first wireless communication section 11 notifies the wireless control section 13a of the disconnection (step S42).

When notified of the disconnection, the wireless control section 13a instructs the second wireless communication section 11a to switch to the normal communication mode (step S43) and instructs the first wireless communication section 11 to start standby reception (step S46).

The second wireless communication section 11a is switched to the normal communication mode (step S44), and enters a communicating state (step S45).

When instructed to start standby reception, the first wireless communication section 11 enters the state of standby reception (step S47).

As described, the wireless communication device 10a can perform data transfer with the wireless communication device on the power transmission side by near field wireless communication by the second wireless communication section 11a.

Figure 11:
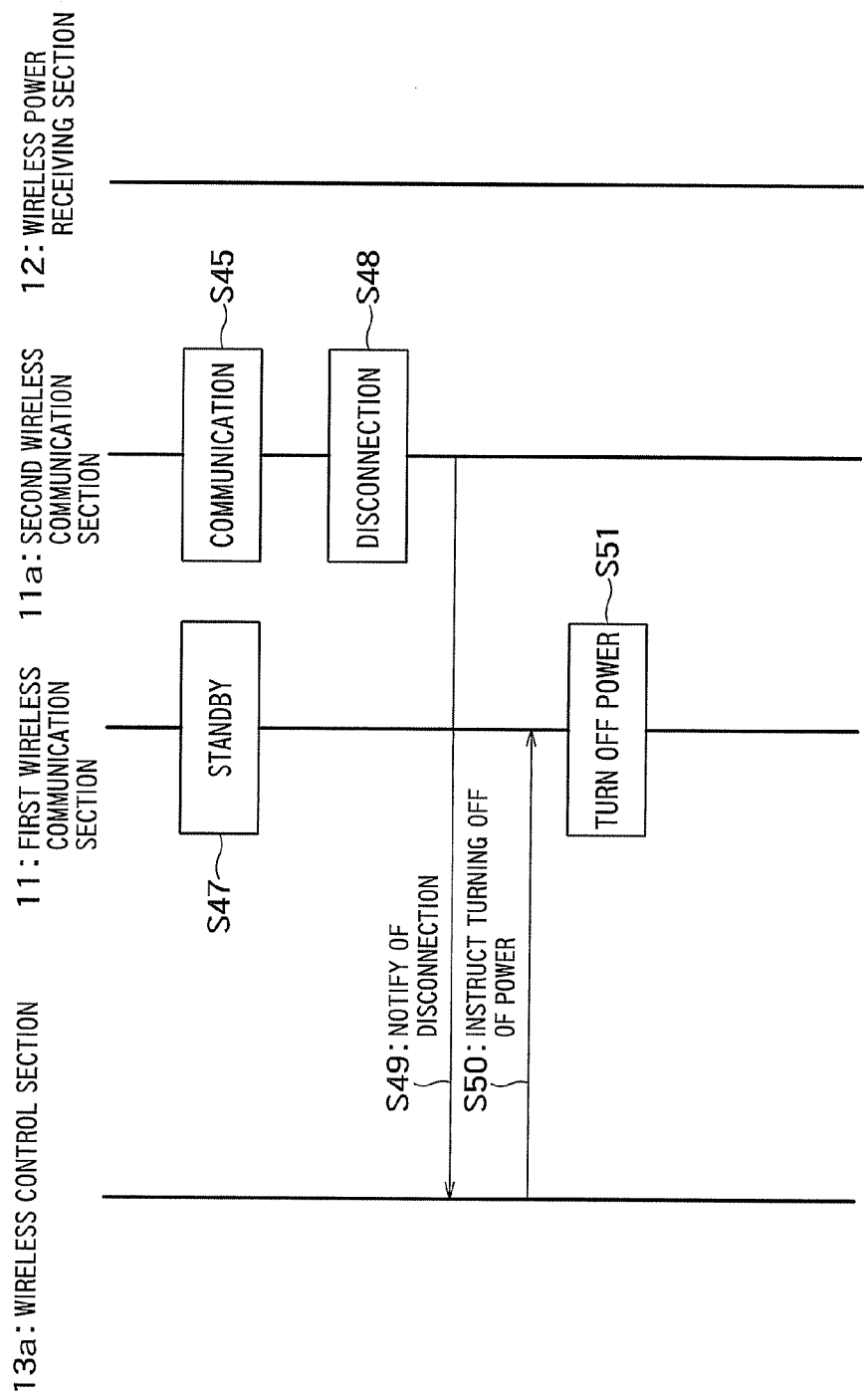
FIG. 11 is a sequence diagram showing the operation of the wireless communication device after FIG. 10.

FIG. 11 is a sequence diagram showing the operation of the wireless communication device after FIG. 10.

When the communicating state (step S45) shifts to a state where the communication is disconnected (step S48), the second wireless communication section 11a notifies the wireless control section 13a of the disconnection (step S49).

When notified of the disconnection, the wireless control section 13a instructs the first wireless communication section to turn off the power (step S50). The first wireless communication section 11 thereby turns off the power (step S51).

Also, in the same manner, when handover is performed in the communicating state (step S45) and the wireless base station which is the connection destination is switched to another wireless base station, the second wireless communication section 11a notifies the wireless control section 13a of the handover. When notified of the handover, the wireless control section 13a instructs the first wireless communication section 11 to turn off the power. The first wireless communication section 11 thereby turns off the power (in the same manner as in the disconnection process; omitted from drawing).

As described, according to the present embodiment, when close proximity wireless communication such as TransferJet by the first wireless communication section 11 is disconnected, the second wireless communication section 11a that performs near field wireless communication such as WiFi is shifted to the normal communication mode, and the first wireless communication section 11 is made to start standby reception. Thus, even if close proximity wireless communication is temporarily disconnected due to the movement of the wireless communication device 10a as a wireless terminal, near field wireless communication can be performed, and also, near field wireless communication can be swiftly switched again to close proximity wireless communication when the wireless communication device 10a is returned to the previous position.

Furthermore, when near field wireless communication by the second wireless communication section 11a is disconnected, or handover is performed, it is determined that the amount of movement of the wireless communication device 10a is great and the user has small intention to keep using the wireless communication service, and the power of the first wireless communication section 11 that performs close proximity wireless communication is turned off to reduce wasteful power consumption.

(Eighth Embodiment)

In a present embodiment, the first wireless communication section 11 is configured as an initiator, and transmits a connection request signal for establishing communication at a first transmission interval or a second transmission interval longer than the first transmission interval.

In the case the first wireless communication section 11 is activated after wireless power reception by the wireless power receiving section 12 is started, the wireless control section 13a causes the first wireless communication section 11 to transmit a connection request signal at the first transmission interval.

Also, in the case communication by the first wireless communication section 11 is disconnected while the second wireless communication section 11a is in the low power consumption mode, the wireless control section 13a causes the second wireless communication section 11a to shift to the normal communication mode, and causes the first wireless communication section 11 to transmit the connection request signal at the second transmission interval.

Furthermore, in the case communication by the first wireless communication section 11 and communication by the second wireless communication section 11a are disconnected, the wireless control section 13a turns off the power of the first wireless communication section 11.

Other configurations of the wireless communication device 10a are the same as those of the sixth embodiment in FIG. 8, and drawings and explanation thereof are not repeated here.

Figure 12:
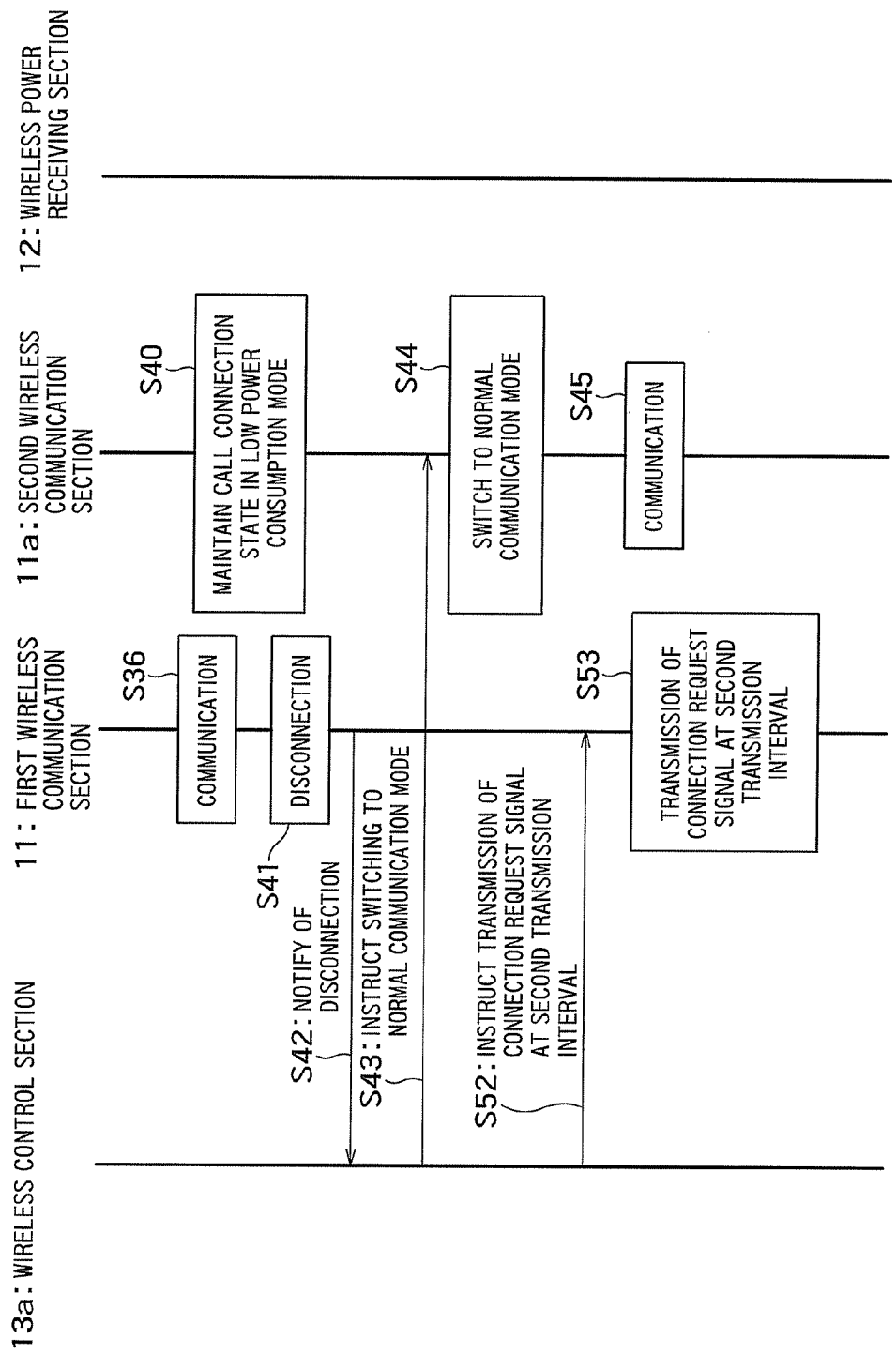
FIG. 12 is a sequence diagram showing an operation of a wireless communication device according to an eighth embodiment.

FIG. 12 is a sequence diagram showing an operation of the wireless communication device 10a according to the eighth embodiment. FIG. 12 shows the operation following steps S36 and S40 in FIG. 9. The processes of steps S36 and S40 to S45 are the same as those of the seventh embodiment, and explanation thereof is not repeated here.

In the present embodiment, when notified of disconnection by the first wireless communication section 11 (step S42), the wireless control section 13a instructs the second wireless communication section 11a to switch to the normal communication mode (step S43), and also, instructs the first wireless communication section 11 to transmit a connection request signal at the second transmission interval (step S52).

The first wireless communication section 11 thereby enters a state of transmitting the connection request signal at the second transmission interval (step S53). At this time, the power consumption of the first wireless communication section 11 is lower than that in the case where the connection request signal is transmitted at the first transmission interval after the wireless power reception by the wireless power receiving section 12 is started.

Figure 13:
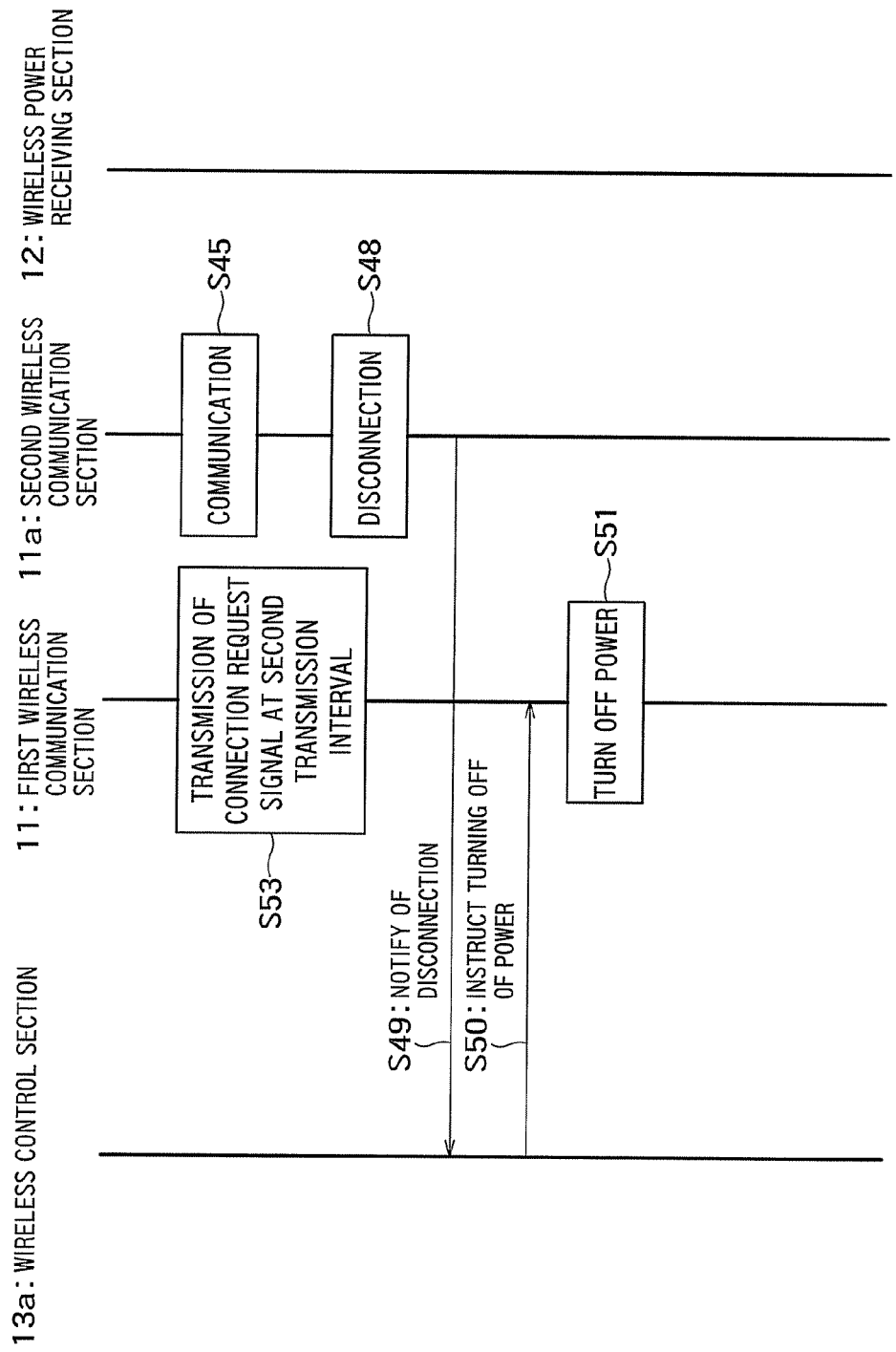
FIG. 13 is a sequence diagram showing the operation of the wireless communication device after FIG. 12.

FIG. 13 is a sequence diagram showing the operation of the wireless communication device after FIG. 12.

When communication is disconnected (step S48) during communication (step S45), the second wireless communication section 11a notifies the wireless control section 13a of the disconnection (step S49).

When notified of the disconnection, the wireless control section 13a instructs the first wireless communication section 11 to turn off the power (step S50). The first wireless communication section 11 thereby turns off the power (step S51).

Also, in the same manner, when handover is performed in the communicating state (step S45) and the wireless base station which is the connection destination is switched to another wireless base station, the second wireless communication section 11a notifies the wireless control section 13a of the handover. When notified of the handover, the wireless control section 13a instructs the first wireless communication section 11 to turn off the power. The first wireless communication section 11 thereby turns off the power (in the same manner as in the disconnection process; omitted from drawing).

As described, according to the present embodiment, when close proximity wireless communication such as TransferJet by the first wireless communication section 11 is disconnected, the second wireless communication section 11a that performs near field wireless communication such as WiFi is shifted to the normal communication mode, and the first wireless communication section 11 is made to transmit the connection request signal at the second transmission interval. That is, the transmission interval of the connection request signal is made longer. Thus, even if close proximity wireless communication is temporarily disconnected due to the movement of the wireless communication device 10a as a wireless terminal, near field wireless communication can be performed, and also, close proximity wireless communication can be restarted with low power consumption by returning the wireless communication device 10a to the previous position.

Furthermore, as in the seventh embodiment, when near field wireless communication by the second wireless communication section 11a is disconnected, or handover is performed, it is determined that the amount of movement of the wireless communication device 10a is great and the user has small intention to keep using the wireless communication service, and the power of the first wireless communication section 11 that performs close proximity wireless communication is turned off to reduce wasteful power consumption.

(Ninth Embodiment)

In a present embodiment, after turning off the power of the first wireless communication section 11, the wireless control section 13a causes the second wireless communication section 11a to scan, for a predetermined period of time, for a base station with which communication was last established (that is, the wireless communication device on the power transmission side). The wireless control section 13a turns off the power of the second wireless communication section 11a in the case the second wireless communication section 11a failed to find the base station with which communication was last established within the predetermined period of time.

Other configurations of the wireless communication device 10a are the same as those of the sixth embodiment in FIG. 8, and drawings and explanation thereof are not repeated here.

Figure 14:
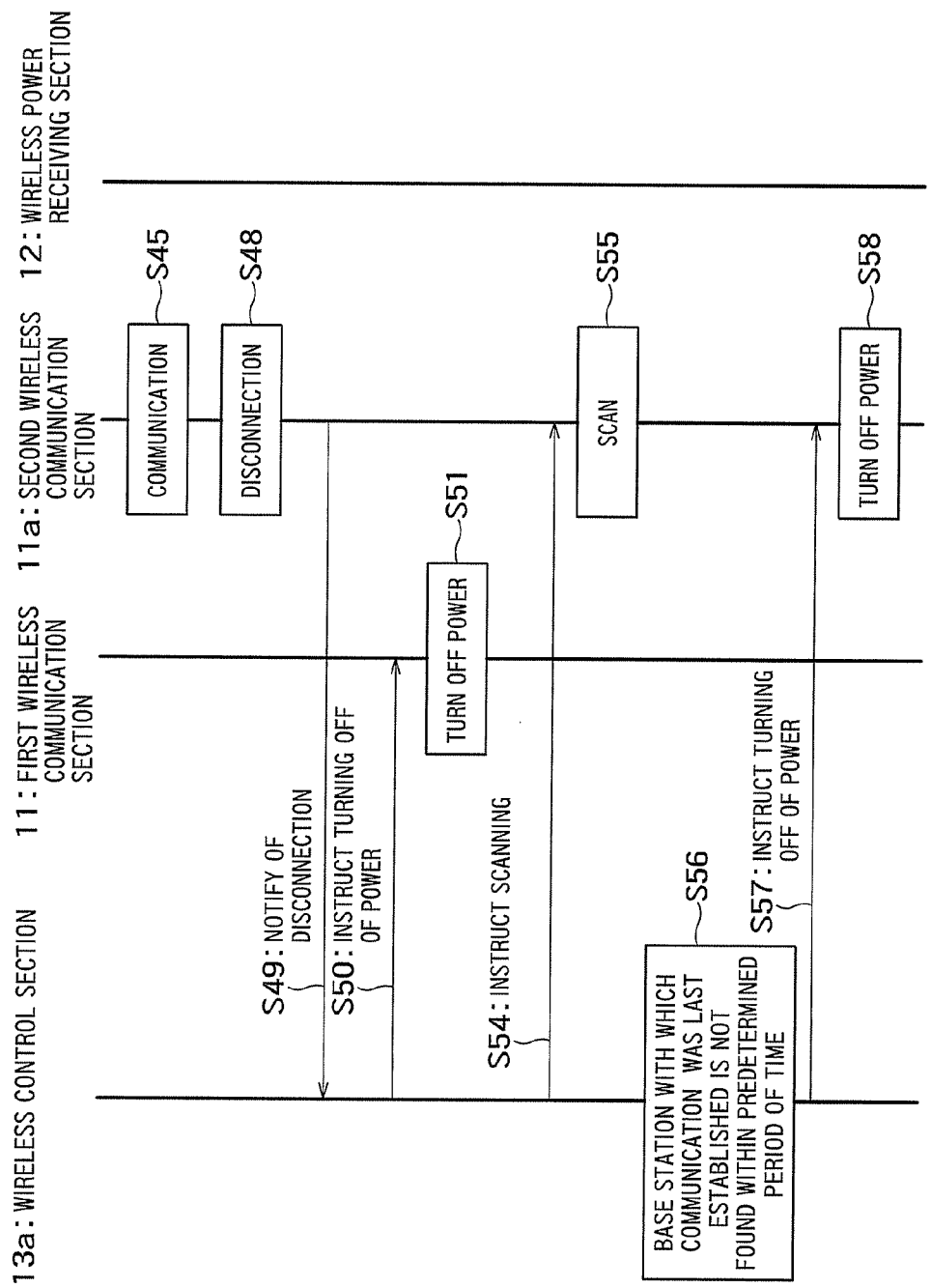
FIG. 14 is a sequence diagram showing an operation of a wireless communication device according to a ninth embodiment.

FIG. 14 is a sequence diagram showing an operation of the wireless communication device according to the ninth embodiment. FIG. 14 shows the operation after steps S45 and S48 to S51 in FIGS. 11 and 13 of the seventh and eighth embodiments. The processes of steps S45 and S48 to S51 are the same as those of the seventh and eighth embodiments, and explanation thereof is not repeated here.

When notified of disconnection by the second wireless communication section 11a, the wireless control section 13a instructs the second wireless communication section 11a to perform scanning (step S54). The second wireless communication section 11a then scans, for a predetermined period of time, for the base station with which communication was last established, according to the communication standard of near field wireless communication (step S55).

In the case the second wireless communication section 11a failed to find the base station with which communication was last established within the predetermined period of time (step S56), the wireless control section 13a instructs the second wireless communication section 11a to turn off the power (step S57). The second wireless communication section 11a thereby turns off the power (step S58).

Moreover, although not shown in the drawing, in the case the second wireless communication section 11a succeeded in step S55 in finding the base station with which communication was last established, the second wireless communication section 11a establishes communication with the base station.

As described, according to the present embodiment, in the case the second wireless communication section 11a failed to find the base station with which communication was last established within the predetermined period of time, it is determined that the amount of movement of the wireless communication device 10a is greater than in the seventh and eighth embodiments and the user has even less intention of keep using the wireless communication service, and the power of the second wireless communication section 11a is turned off. Wasteful power consumption can thereby be further reduced.

Modified Example

In the first to third embodiments, an example is described where the first wireless communication section 11 of the wireless communication device 10 starts standby reception after being activated, but the first wireless communication section 11 may alternatively transmit, after being activated, a wireless connection request signal by transmitting the first wireless signal.

Also, in the fourth embodiment, an example is described where the wireless communication section 21 of the wireless communication device 20 transmits, after being activated, a wireless connection request signal by transmitting the first wireless signal, but the wireless communication section 21 may alternatively start standby reception after being activated.

According to at least one of the embodiments described above, the convenience of a user can be enhanced by the presence of the wireless control section 13 that activates the first wireless communication section 11 after wireless power reception by the wireless power receiving section 12 is started.

At least a portion of the wireless communication system described in the above embodiments may be constituted by hardware or software. In the software configuration, a program realizing at least a portion of the functions of the wireless communication system is stored in a recording medium such as a flexible disk or a CD-ROM and may be read by a computer to be executed thereby. The storage medium is not limited to a detachable one such as a magnetic disk and an optical disk and may be a stationary recording medium such as a hard disk device and a memory.

Furthermore, the program realizing at least a portion of the wireless communication system may be distributed through a communication line (including wireless communication) such as the Internet. While the program is encrypted, modulated, or compressed, the program may be distributed through a wired line or a wireless line such as the Internet, or the program stored in a recording medium may be distributed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A wireless communication device comprising:
a first wireless communication section configured to transmit and receive a first wireless signal;
a wireless power receiving section configured to receive power by a second wireless signal; and
a wireless control section configured to control the first wireless communication section according to a wireless power reception state of the wireless power receiving section,
wherein the wireless control section activates the first wireless communication section after wireless power reception by the wireless power receiving section is started,
wherein the wireless power receiving section comprises a first phase where at least negotiation for stable wireless power reception is performed according to the start of the wireless power reception, and a second phase where the stable wireless power reception is started, and
wherein the wireless control section activates the first wireless communication section after the wireless power receiving section has shifted from the first phase to the second phase.

2. The wireless communication device according to claim 1, further comprising:
a second wireless communication section capable of switching between a normal communication mode and a low power consumption mode in which power consumption is lower than in the normal communication mode, and configured to transmit and receive a third wireless signal in the normal communication mode and the low power consumption mode, a communication range of the second wireless communication section being greater than the communication range of the first wireless communication section,
wherein the wireless control section activates the second wireless communication section, in addition to the first wireless communication section, after the wireless power reception by the wireless power receiving section is started, and in a case where communication by the activated first wireless communication section and communication in the normal communication mode by the activated second wireless communication section are established, the wireless control section causes the second wireless communication section to shift to the low power consumption mode while maintaining the communication.

3. The wireless communication device according to claim 2, wherein, in the low power consumption mode, the second wireless communication section intermittently performs transmission and reception at a cycle longer than in the normal communication mode.

4. The wireless communication device according to claim 2, wherein, in a case where communication by the first wireless communication section is disconnected while the second wireless communication section is in the low power consumption mode, the wireless control section causes the second wireless communication section to shift to the normal communication mode, and causes the first wireless communication section to start standby reception.

5. The wireless communication device according to claim 4, wherein the wireless control section turns off power of the first wireless communication section in a case where communication by the first wireless communication section and communication by the second wireless communication section are disconnected.

6. The wireless communication device according to claim 5, wherein the wireless control section causes, after turning off power of the first wireless communication section, the second wireless communication section to scan, for a predetermined period of time, for a base station with which communication was last established, and in a case where the second wireless communication section failed to find the base station with which communication was last established within the predetermined period of time, the wireless control section turns off power of the second wireless communication section.

7. The wireless communication device according to claim 4,
wherein, in a case where handover is performed in the normal communication mode, the second wireless communication section notifies the wireless control section of the handover, and
wherein the wireless control section turns off power of the first wireless communication section in a case where communication by the first wireless communication section is disconnected and the wireless control section is notified of the handover.

8. The wireless communication device according to claim 2,
wherein the first wireless communication section transmits a connection request signal for establishing communication at a first transmission interval or a second transmission interval, the second transmission interval being longer than the first transmission interval,
wherein, in a case where the first wireless communication section is activated after the wireless power reception by the wireless power receiving section is started, the wireless control section causes the first wireless communication section to transmit the connection request signal at the first transmission interval, and
wherein, in a case where communication by the first wireless communication section is disconnected while the second wireless communication section is in the low power consumption mode, the wireless control section causes the second wireless communication section to shift to the normal communication mode and causes the first wireless communication section to transmit the connection request signal at the second transmission interval.

9. The wireless communication device according to claim 8, wherein the wireless control section turns off power of the first wireless communication section in a case where communication by the first wireless communication section and communication by the second wireless communication section are disconnected.

10. The wireless communication device according to claim 9, wherein the wireless control section causes, after turning off power of the first wireless communication section, the second wireless communication section to scan, for a predetermined period of time, for a base station with which communication was last established, and in a case where the second wireless communication section failed to find the base station with which communication was last established within the predetermined period of time, the wireless control section turns off power of the second wireless communication section.

11. The wireless communication device according to claim 8,
wherein, when handover is performed in the normal communication mode, the second wireless communication section notifies the wireless control section of the handover, and
wherein the wireless control section turns off power of the first wireless communication section in a case where communication by the first wireless communication section is disconnected and the wireless control section is notified of the handover.

12. The wireless communication device according to claim 1, further comprising:
a second wireless communication section capable of switching between a normal communication mode and a low power consumption mode in which power consumption is lower than in the normal communication mode, and configured to transmit and receive a third wireless signal in the normal communication mode and the low power consumption mode, a communication range of the second wireless communication section being greater than the communication range of the first wireless communication section,
wherein, in a case where communication is performed by the second wireless communication section before start of the wireless power reception by the wireless power receiving section, the wireless control section performs a reconnection process for the second wireless communication section after the wireless power reception by the wireless receiving section is started.

13. The wireless communication device according to claim 1, further comprising:
a second wireless communication section capable of switching between a normal communication mode and a low power consumption mode in which power consumption is lower than in the normal communication mode, and configured to transmit and receive a third wireless signal in the normal communication mode and the low power consumption mode, a communication range of the second wireless communication section being greater than the communication range of the first wireless communication section,
wherein the first wireless communication section establishes communication after being activated, and
wherein, in a case where communication is performed by the second wireless communication section before start of the wireless power reception by the wireless power receiving section, the wireless control section checks, after the wireless power reception by the wireless power receiving section is started, whether or not a base station to which the second wireless communication section is connected is a base station that is associated with a base station to which the first wireless communication section is connected, and in a case where the base station to which the second wireless communication section is connected is not a base station that is associated with the base station to which the first wireless communication section is connected, the wireless control section performs a reconnection process for the second wireless communication section.

14. A wireless communication system comprising:
a first wireless communication device according to claim 1; and
a second wireless communication device comprising:
a wireless communication section configured to transmit and receive a first wireless signal;
a wireless power transmission section configured to transmit power by a second wireless signal; and
a wireless control section configured to control the wireless communication section according to a wireless power transmission state of the wireless power transmission section, wherein the wireless control section activates the wireless communication section after wireless power transmission by the wireless power transmission section is started.

15. A wireless communication device comprising:
a first wireless communication section configured to transmit and receive a first wireless signal;
a wireless power receiving section configured to receive power by a second wireless signal; and
a wireless control section configured to control the first wireless communication section according to a wireless power reception state of the wireless power receiving section,
wherein the wireless control section activates the first wireless communication section after wireless power reception by the wireless power receiving section is started,
wherein the first wireless communication section starts standby reception after being activated, and
wherein the first wireless communication section continues the standby reception for a predetermined period of time, and stops the standby reception when the first wireless signal is not received within the predetermined period of time.

16. A wireless communication device comprising:
a first wireless communication section configured to transmit and receive a first wireless signal;
a wireless power receiving section configured to receive power by a second wireless signal; and
a wireless control section configured to control the first wireless communication section according to a wireless power reception state of the wireless power receiving section,
wherein the wireless control section activates the first wireless communication section after wireless power reception by the wireless power receiving section is started, and
wherein a distance allowing power supply by the second wireless signal is less than a distance allowing communication by the first wireless signal.

* * * * *